(12) United States Patent
Ramler et al.

(10) Patent No.: US 7,975,715 B2
(45) Date of Patent: Jul. 12, 2011

(54) TRAILER SPRING BRAKE VALVE

(75) Inventors: Travis G. Ramler, Elyria, OH (US); Andrew Marsh, Elyria, OH (US); David Fenzel, Grafton, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 1065 days.

(21) Appl. No.: 11/811,629

(22) Filed: Jun. 11, 2007

(65) Prior Publication Data

US 2008/0303341 A1    Dec. 11, 2008

(51) Int. Cl.
*G05D 7/00* (2006.01)
*F16K 15/14* (2006.01)
*B60T 15/38* (2006.01)
*B60T 11/34* (2006.01)

(52) U.S. Cl. ............ 137/102; 137/851; 303/64; 303/33; 303/40

(58) Field of Classification Search .................. 137/102, 137/843, 851, 543; 303/7, 64, 33, 40, 69
See application file for complete search history.

(56) References Cited

U.S. PATENT DOCUMENTS

| | | | |
|---|---|---|---|
| 2,960,998 A * | 11/1960 | Sinker et al. .................. | 137/542 |
| 4,003,605 A * | 1/1977 | Fannin ........................ | 303/9.76 |
| 4,169,633 A * | 10/1979 | Stearns ............................ | 303/7 |
| 4,596,265 A | 6/1986 | Goodell | |
| 4,915,456 A | 4/1990 | Gross et al. | |
| 5,172,958 A | 12/1992 | Sell | |
| 5,284,384 A | 2/1994 | Herring | |
| 5,286,095 A | 2/1994 | Sell et al. | |
| 5,417,479 A * | 5/1995 | Wallestad et al. ................. | 303/7 |
| 5,425,572 A | 6/1995 | Koelzer et al. | |
| 5,553,928 A * | 9/1996 | Hart et al. .......................... | 303/7 |
| 6,116,280 A | 9/2000 | Goodell | |
| 6,769,744 B2 | 8/2004 | Marsh et al. | |
| 7,077,481 B2 | 7/2006 | Marsh et al. | |

OTHER PUBLICATIONS

"Bendix SR-5 Trailer Spring Brake Valve", Bendix Service Data Sheet SD-03-4516, Bendix Commercial Vehicle Systems LLC, 2004.
"Bendix SR-7 Spring Brake Modulating Valve", Bendix Service Data Sheet SD-03-9043, Bendix Commercial Vehicle Systems LLC, 2004.
"Bendix Piggyback Spring Brake", Bendix Service Data Sheet SD-02-4500, Bendix Commercial Vehicle Systems LLC, 2004.

* cited by examiner

*Primary Examiner* — Stephen M Hepperle
*Assistant Examiner* — Atif H Chaudry
(74) *Attorney, Agent, or Firm* — Fay Sharpe LLP

(57) ABSTRACT

A valve for use in a pneumatic system of a truck-trailer having a source of air under pressure, a reservoir, at least one spring brake unit and a brake service line is provided. The valve includes a housing, a pressure protection valve portion, a spring brake actuation valve portion and an anti-compounding valve portion. The housing has a supply passage in communication with the source of air under pressure. The pressure protection valve portion is disposed within a first chamber of the housing. The first chamber has an inlet in communication with the supply passage and an outlet in communication with the reservoir. The pressure protection valve portion is configured to selectively block the flow of pressurized air from the supply passage to the reservoir through the first chamber. The spring brake actuation valve portion is disposed within a second chamber of the housing.

15 Claims, 7 Drawing Sheets

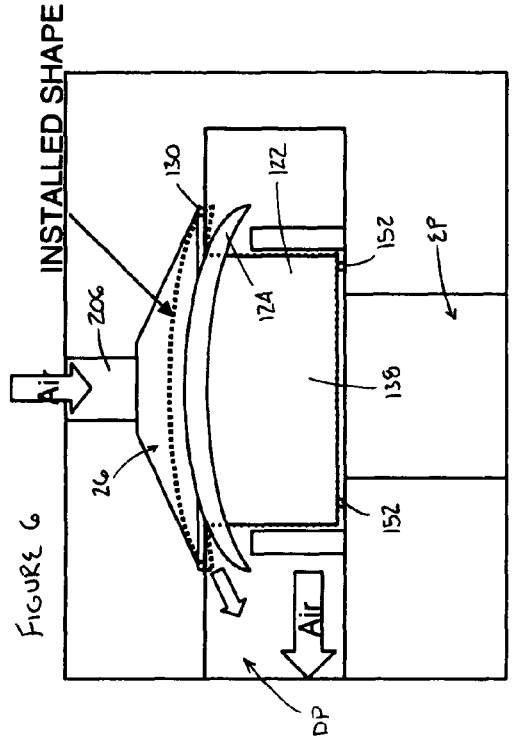
FIGURE 6 INSTALLED SHAPE
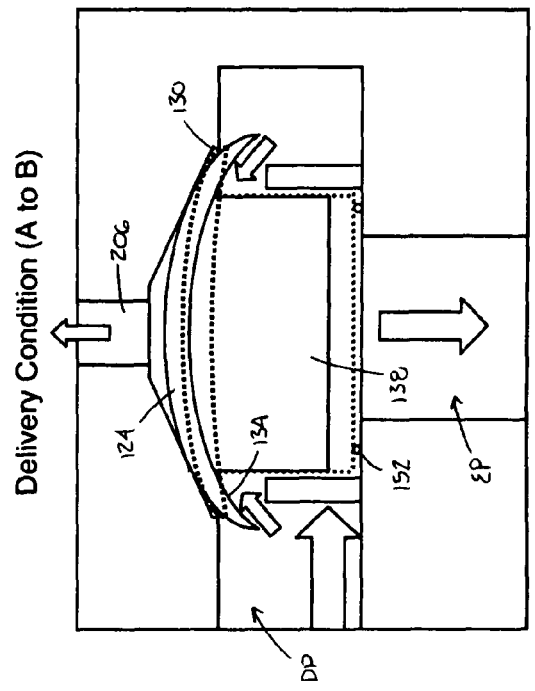
FIGURE 8 Exhaust Condition (C to A)
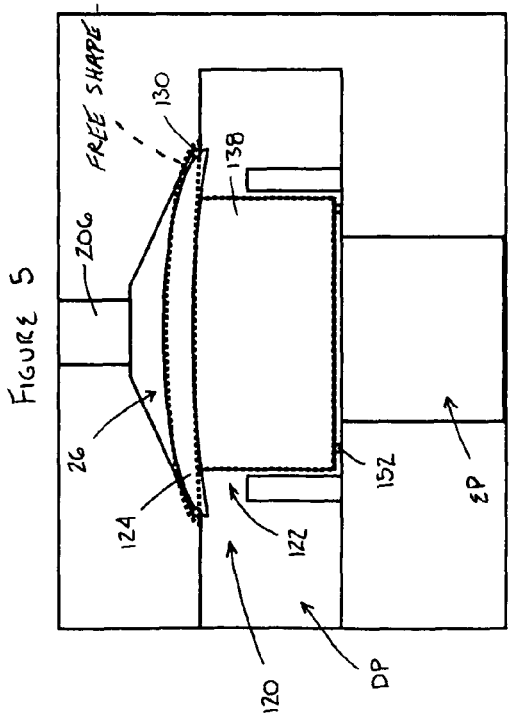
FIGURE 5 FREE SHAPE
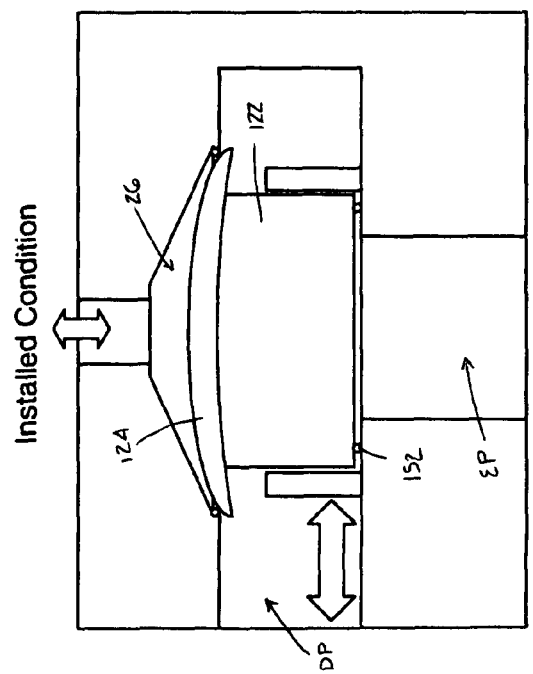
FIGURE 7 Hold Condition B to C
Installed Condition
Delivery Condition (A to B)

TRAILER SPRING BRAKE VALVE

BACKGROUND

The present disclosure generally relates to brake valves. More particularly, the present disclosure relates to an improved, multi-function, air valve for use in connection with spring applied air release parking brakes typically used in heavy-duty truck trailers.

It is known in the truck-trailer art to employ parking brakes of the type where large spring brakes are normally apply a braking force, and an accompanying air chamber is pressurized to counteract the springs and release the force. Thus, if there is a loss in pressurized air in the system, the pressure in the brake chamber is consequently reduced and the spring brakes applied.

Likewise, these vehicles often incorporate a pressure protection valve in the system to protect the tractor's air supply and prevent automatic apply of trailer spring brakes with a supply system failure.

Still another type of valve often used in truck-trailers is an anti-compounding valve intended to limit the application of additional pressure to the service brakes when the spring brakes are already applied. U.S. Pat. No. 5,284,384 discloses an arrangement that combines these different valves into a single housing. The multi-function spring brake valve with anti-compounding, pressure protection and quick release functions are performed by multiple valve clusters. However, the prior art arrangement uses a shuttle loaded valve for pressure protection and a single biased check valve for anti-compounding, as well as routing the air through the valve chambers in a very specific manner.

Moreover, the prior art valve structures do not provide significant differential, and particularly does not advantageously use hysteresis on a supply curve side. Although the prior art single purpose and multi-function valves perform their respective functions, such valves generally operate in an inefficient manner, and do not teach or show a valve with unique valve clusters or portions to prevent air flow to an on/off parking valve structure, nor a quick-exhaust diaphragm that achieves a special measure of differential.

Accordingly, there is a need for a multi-function valve that provides a valve as a combined unit that includes (i) an on/off parking valve cluster or portion, (ii) a second valve cluster or portion for protecting and filling a trailer reservoir, and (iii) a third valve cluster or portion to prevent compounding of the brakes by preventing fluid communication to the on/off parking valve portion and venting air out the evacuated system passage or port, i.e., a bias double check, as well as a solution to one or more of the deficiencies from which the prior art valves have suffered.

BRIEF DESCRIPTION

A valve for use in a braking system of a truck-trailer is disclosed and has a source of air under pressure, a reservoir, at least one spring brake unit and a brake service line. The valve comprises a housing, a pressure protection valve portion, a spring brake actuation valve portion and an anti-compounding valve portion. The housing has a supply passage in communication with the source of air under pressure.

The pressure protection valve portion is operably disposed within a first chamber of the housing. The first chamber has an inlet in communication with the supply passage and an outlet in communication with the reservoir. The pressure protection valve portion is configured to selectively block the flow of pressurized air from the supply passage through the first chamber to the reservoir until a predetermined pressure is reached.

The spring brake actuation valve portion is operably disposed within a second chamber defined by the housing. The second chamber has an inlet in communication with the supply passage, at least one delivery outlet passage in communication with the at least one spring brake unit and an exhaust outlet in communication with the at least one spring brake unit. The spring brake actuation valve portion controllably allows pressurized air flow toward at least one spring brake unit and the exhaust outlet.

The anti-compounding valve portion is operably disposed within a third chamber defined by the housing for preventing simultaneous application of the at least one air spring brake unit and at least one service brake unit. The third chamber has a first inlet in communication with the supply passage, a second inlet in communication with the brake service line and a first outlet in communication with the first chamber and a second outlet in communication with the second chamber. The anti-compounding valve portion prevents flow of pressurized air from the brake service line towards the spring brake actuation valve cluster.

A method of operating a braking system of a truck-trailer having a source of air under pressure and at least one spring brake unit is provided. The method comprises providing a valve for the braking system. The valve includes a valve body having a supply passage in communication with the source of air under pressure, at least one delivery passage in communication with the at least one spring brake unit and an exhaust passage in communication with the at least one spring brake unit. The valve further includes a quick release diaphragm operably disposed in a chamber of the valve body for selectively isolating the supply passage, at least one delivery passage, and the exhaust outlet from each other. A pre-stress is applied to the quick release diaphragm so that the at least one spring brake unit is released by delivering pressurized air from the supply passage. A parking application of the at least one spring brake unit is controlled by delivering pressurized air from the at least one spring brake unit to the exhaust passage.

A valve for use in a braking system of a truck-trailer having a source of air under pressure, a reservoir, at least one spring brake unit and a brake service line is provided. The valve comprises a housing including a supply passage in communication with the source of air under pressure, at least one delivery passage in communication with the supply passage and the at least one spring brake unit, an exhaust passage in communication with the at least one spring brake unit, a reservoir passage in communication with the supply passage and the reservoir, and a service passage in communication with the at least one brake service line and the supply port.

A pressure protection valve means disposed within a first chamber defined by the housing selectively blocks the flow of pressurized air from the supply passage to the reservoir through the reservoir passage until a predetermined pressure is reached.

A spring brake actuation valve means disposed within a second chamber defined by the housing controllably allows pressurized air flow toward at least one delivery passage and the exhaust passage. The spring brake actuation valve means includes a pre-stressed quick release diaphragm.

An anti-compounding valve means disposed within a third chamber defined by the housing prevents simultaneous application of the at least one air spring brake unit and at least one service brake unit. The anti-compounding valve means prevents flow of pressurized air from the brake service line towards the pre-stressed quick release diaphragm.

Pre-stressing the diaphragm advantageously controls leakage through the associated valve seat, promotes actuation of the valve when supply pressure is slowly reduced and provides less-erratic operation than non-stressed diaphragms.

An additional benefit resides in preventing air from being directed toward the spring brake on/off portion and thus prevents actuation of the components which improves system life.

Still other aspects and benefits of the present disclosure will become apparent from a reading and understanding of the detailed description of the illustrated embodiment hereinbelow.

BRIEF DESCRIPTION OF THE DRAWINGS

FIG. 5 shows the spring brake actuation valve portion of the valve of FIG. 1 in an installed condition.

FIG. 6 illustrates the spring brake actuation valve portion of the valve of FIG. 1 in a delivery condition.

FIG. 7 shows the spring brake actuation valve portion of the valve of FIG. 1 in a hold condition.

FIG. 8 illustrates the spring brake actuation valve portion of the valve of FIG. 1 in an exhaust condition.

DETAILED DESCRIPTION

Figure 1:
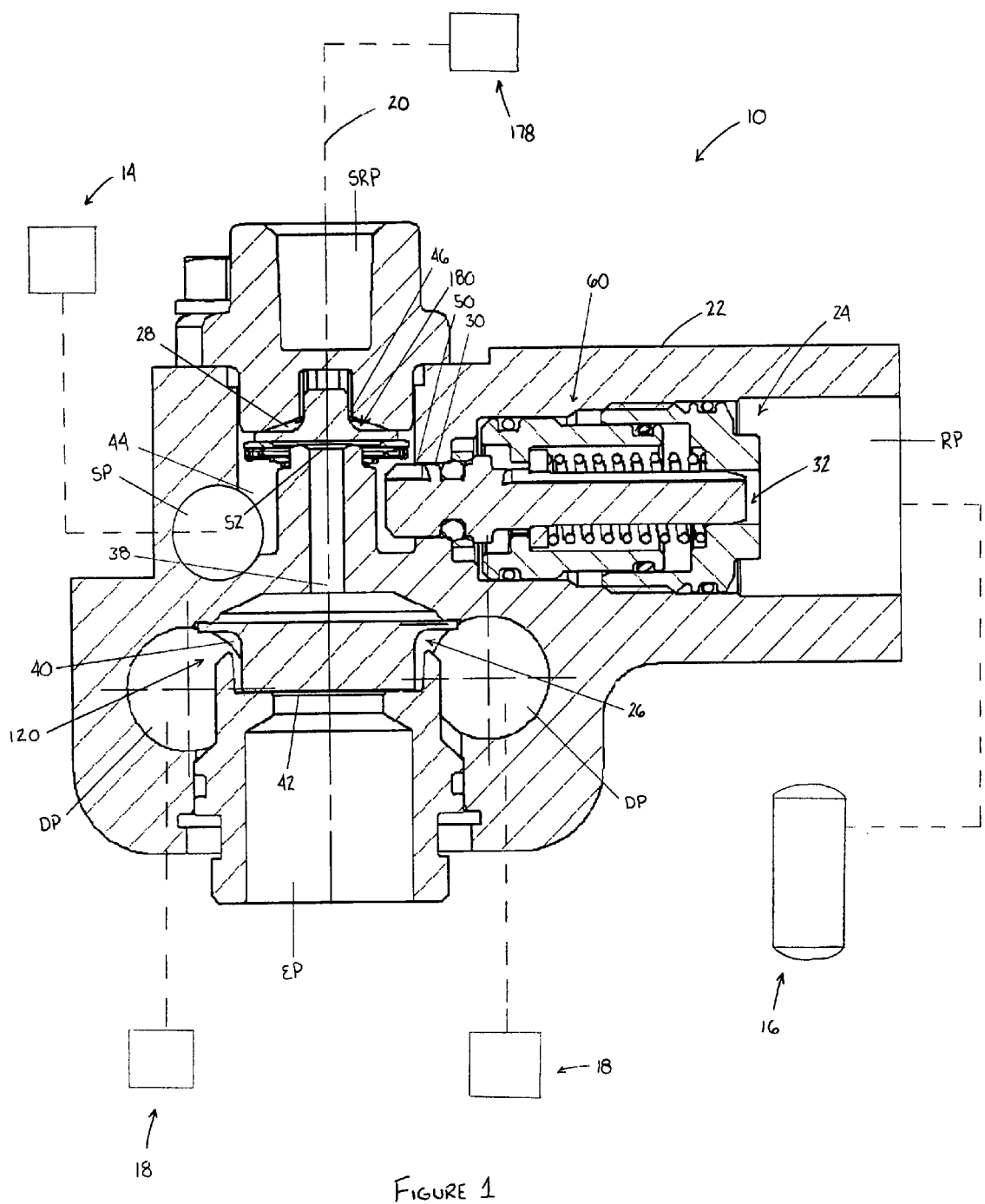
FIG. 1 is a cross-sectional view of a valve for use in a pneumatic system of a truck-trailer in accordance with one aspect of the present disclosure.

It should, of course, be understood that the description and drawings herein are merely illustrative and that various modifications and changes can be made in the structures disclosed without departing from the scope and spirit of the present disclosure. It will also be appreciated that the various identified components of the pneumatic valve disclosed herein are merely terms of art that may vary from one manufacturer to another and should not be deemed to limit the present invention. All references to direction and position, unless otherwise indicated, refer to the orientation of the pneumatic valve illustrated in the drawings and should not be construed as limiting the claims appended hereto.

Referring now to the drawings, wherein like numerals refer to like parts throughout the several views, FIG. 1 illustrates a pneumatic, multi-function valve 10 in accordance with the present disclosure for use in a pneumatic system of a truck-trailer having a source 14 of air under pressure, a reservoir 16, at least one spring brake unit 18 and a brake service line 20. The interconnections and communicative relationships among the source of air pressure, reservoir, spring brake unit and brake service line are illustrated in FIG. 1.

The valve 10 comprises a valve body 22 that includes a supply passage SP, at least one delivery passage DP, an exhaust passage EP, a reservoir passage RP and a service passage SRP. The supply passage is in communication with the source 14 of air under pressure. The delivery passage DP is in selective communication with the supply passage SP and in communication with the spring brake unit 18. In the depicted embodiment, the valve body includes a pair of spaced apart delivery passages, each delivery passage being in communication with a separate spring brake unit; although one skilled in the art will understand that two ports need not necessarily be provided in the valve, and instead the delivery passage can be branched at a location downstream of the valve body. The exhaust passage EP is in selective communication with a chamber of the spring brake unit via the delivery passage. The reservoir passage RP is in selective communication with the supply passage and in communication with the reservoir 16. The service passage SRP is in selective communication with the brake service line 20 and the supply passage.

The valve body 22 further includes first, second and third chambers 24, 26 and 28, respectively. The first chamber has an inlet 30 in selective communication with the supply passage SP and an outlet 32 in selective communication with the reservoir 16 via the reservoir passage RP. The second chamber 26 has an inlet 38 in selective communication with the supply passage, an outlet 40 in selective communication with the chambers of the spring brake units via the delivery passages DP and an exhaust outlet 42 adapted to communicate with atmosphere. The third chamber 28, on the other hand, has a first inlet 44 in selective communication with the supply passage SP, a second separate inlet 46 in selective communication with the brake service line SRP, a first outlet 50 in selective communication with the first chamber 24 and a second separate outlet 52 in selective communication with the second chamber 26.

Figure 2:
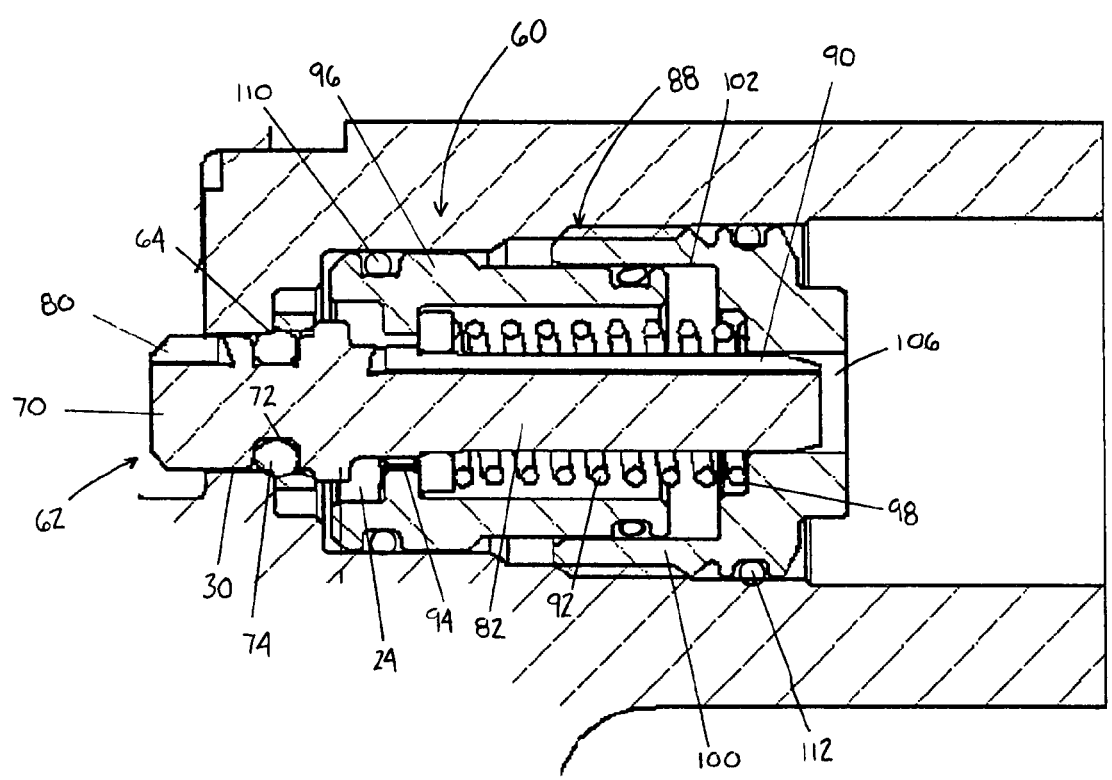
FIG. 2 is an enlarged cross-sectional view of a pressure protection valve portion of the valve of FIG. 1.

A pressure protection valve portion or cluster 60 is operably disposed within the first chamber 24 of the valve body 22, and is configured to selectively block the flow of pressurized air from the supply passage SP through the first chamber to the reservoir 16 until a predetermined pressure is reached. With particular reference to FIG. 2, the pressure protection valve cluster 60 generally includes a first valve member 62 reciprocally movable within the first chamber 24 from a first position in sealing engagement with a first chamber valve seat 64 formed at the inlet 30 of the first chamber 24 and defined by an inner wall of the first chamber to a second position spaced from the valve seat. The first valve member 62 includes a nose or extension member 70 at least partially received in the first chamber inlet 30 for selectively closing off the inlet from the flow of pressurized air from the supply port SP. A recess 72, which circumscribes a section of the nose member 70, receives a seal member 74, such as an elastomeric O-ring. The seal member sealingly engages the valve seat 64 in the first, closed position to prevent communication of air between the first valve member 62 and the first chamber inner wall. The nose member 70 further includes a first cutout or groove 80 extending longitudinally from an end portion of the head member that at least partially projects into the third chamber 28.

The first valve member further includes an elongated stem 82 extending outwardly from the nose member 70 into the first chamber 24. The stem projects at least partially through a cap assembly 88 located in the first chamber and includes a longitudinally extending second cutout or groove 90. As will be described in greater detail below, the first groove 80 allows pressurized air to flow from the supply port into the first chamber 24 and the second groove 90 allows pressurized air to flow from the first chamber to the reservoir port RP when the first valve member 62 is in the second position.

The cap assembly 88 includes a single biasing member 92 which at least partially circumscribes a portion of the stem 82 for urging the first valve member 62 toward the closed position. The biasing member is in engagement at a first end with a shoulder 94 formed on a valve body 96 of the cap assembly. A second end of biasing member is in engagement with a shoulder 98 provided on an adjustment member 100 of the cap assembly. When the first valve member 62 is moved into the open position, the biasing member 92 will continue to urge the first valve member in a direction toward valve seat 64. Thus, when a predetermined pressure is reached, the first valve member will open and allow air under pressure to flow to the reservoir 16. The biasing member will urge the valve member to prevent air from the reservoir from flowing toward the inlet 30 in case of any reduction of pressure from the supply port SP.

With continued reference to FIG. 2, a portion of the valve body 96 is at least partially received in a sleeve portion 102 of the adjustment member 100. At least one of the valve body and adjustment member includes a seal member for sealing engagement with the inner wall of the first chamber 24 to prevent air flow. The adjustment member 100 is provided with an opening 106 which is dimensioned to at least partially receive the stem 82. It should be appreciated that the adjustment member can be adjustably positioned in the first chamber so as to precisely adjust the degree of compression of the biasing member 92 which, in turn, adjusts the closing pressure of first valve member 62 against the valve seat 64. The greater the closing pressure, the greater the air pressure required to move the first valve member away from seat. Seals 110, 112 preferably carried by the valve body 96 and adjustment member 100, respectively, selectively seal between the valve body and adjustment member and the first chamber 24.

Figure 3:
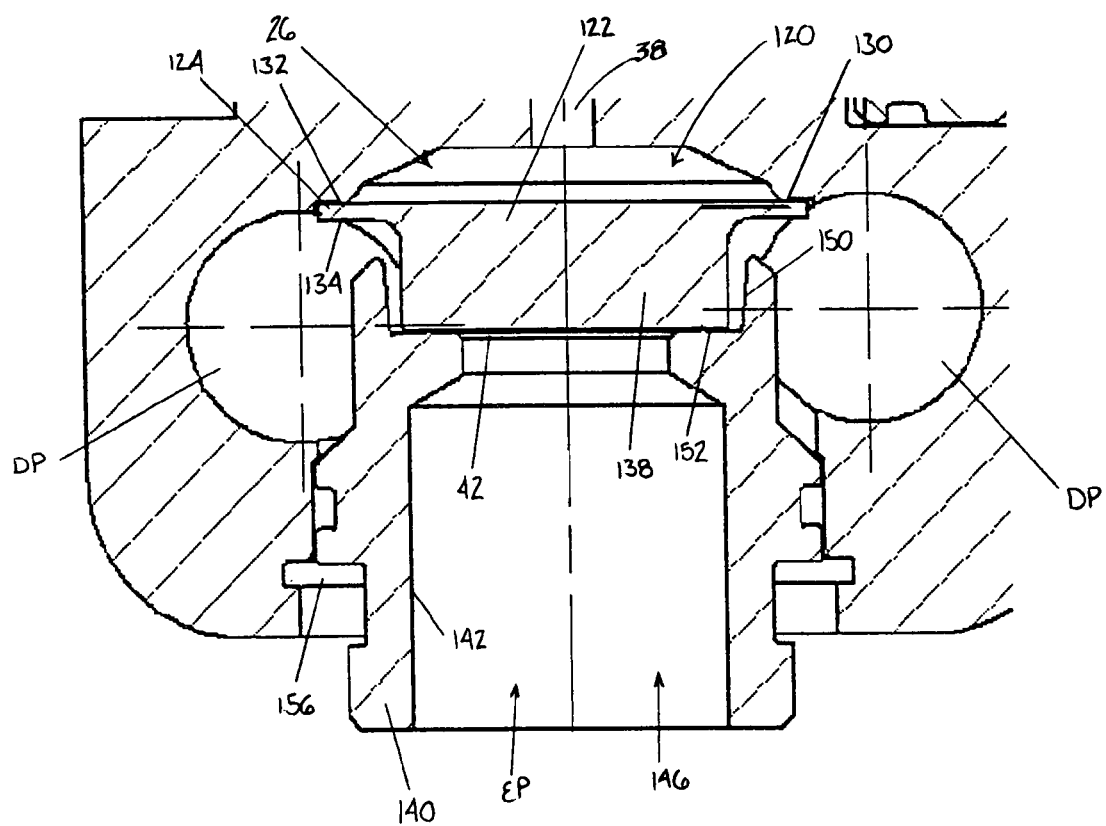
FIG. 3 is an enlarged cross-sectional view of a spring brake actuation valve portion of the valve of FIG. 1.

With reference now to FIGS. 1 and 3, a spring brake actuation valve portion or cluster 120 is housed within the second chamber 26 of the valve body 22. The spring brake actuation valve portion is configured to control pressurized air flow toward the spring brake unit 18 via the delivery passage DP and the exhaust outlet 42.

The spring brake actuation valve portion 120 includes a quick release diaphragm 122 for selectively isolating the second chamber inlet 38, the delivery passages DP and the exhaust outlet 42 from each other. The diaphragm includes an outer peripheral annular portion 124 in selective engagement with an annular valve seat 130 defined by a second chamber forming surface of the housing 22. As will be discussed in greater detail below, a first surface 132 of the annular portion 124 is subject to air pressure from the supply port SP, and is separated from the valve seat in a first direction to deliver air from the supply passage to the delivery passages. A second surface 134 of the annular portion is subject to pressure from the delivery passage DP, and is separated in a second direction to deliver air from the spring brake unit to the exhaust passage EP. The diaphragm 122 further includes a central portion 138 for selectively blocking air from the delivery passage to the exhaust outlet 42. The central portion 138 extends outwardly from the annular portion 124, an outer surface of the central portion being inwardly offset from an outer perimeter surface of the annular portion.

The spring brake actuation valve portion 120 further includes a member 140 at least partially received in the exhaust outlet 42. The member has a sleeve-like shape and includes an inner surface 142 defining a passageway 146 which cooperates with the housing 22 to form the exhaust passage EP. A counter bore or guide 150 formed in an inboard end of the member 140 is dimensioned to at least partially receive the central portion 138 of the diaphragm 122. The guide forms a valve seat 152, the diaphragm being in selective engagement with the valve seat. A seal and/or plastic weld joint 156 preferably carried by the member 140 selectively seals between the member and the second chamber 26.

As shown in FIG. 5, the diaphragm 122, in the installed condition, is generally pre-stressed between approximately 1 psi and approximately 5 psi; although, depending on the application of the valve 10, the pre-stress of the diaphragm can exceed 5 psi. The annular portion 124 is in sealing engagement with the annular valve seat 130 and the central portion 138 is in engagement with the valve seat 152 of the member 140 (not illustrated). The member 140 can include means for deflecting the central portion, such as a rib (not shown) projecting from one of the housing 22 and the member 140.

Figure 4:
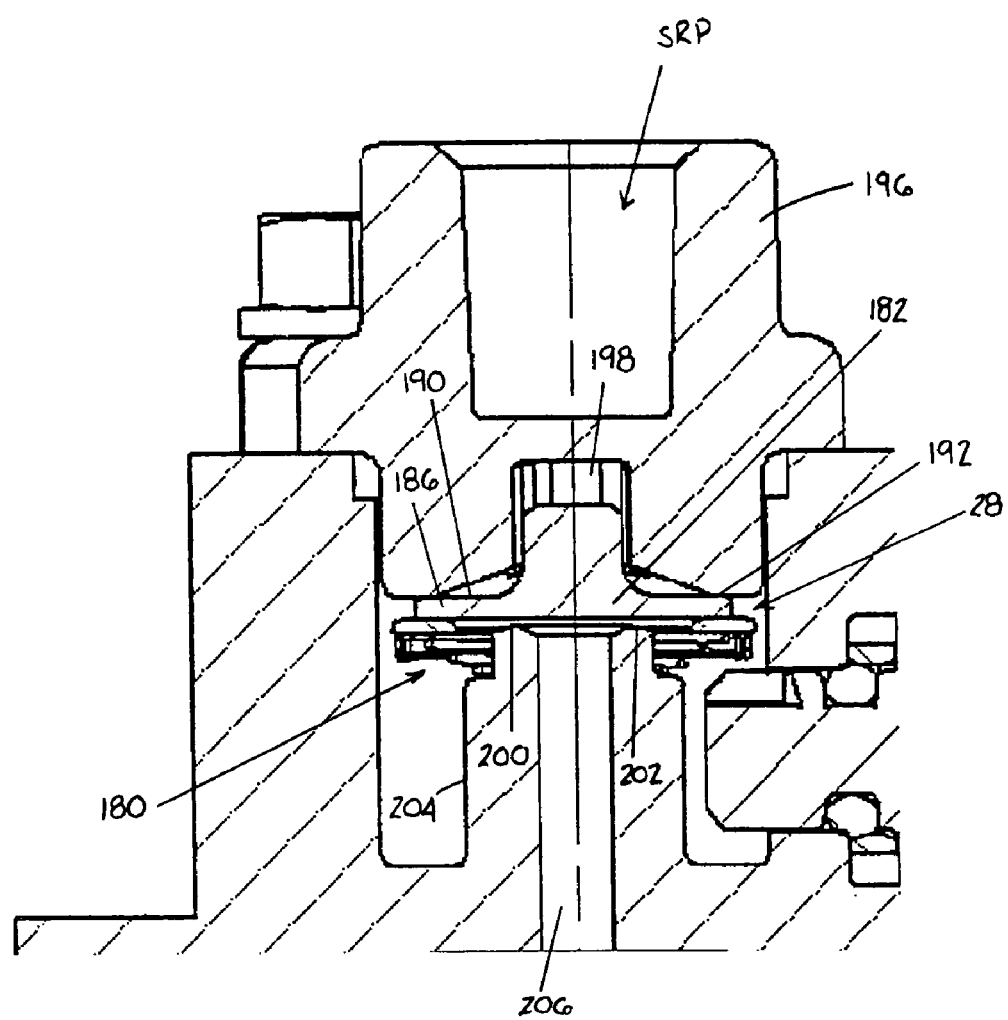
FIG. 4 is an enlarged cross-sectional view of an anti-compounding valve portion of the valve of FIG. 1.

With reference to FIGS. 1 and 4, an anti-compounding valve portion or cluster 180 is operably disposed within the third chamber 28 of the valve body 22. The anti-compounding valve portion is configured to prevent simultaneous application of the air spring brake unit 18 and brake unit 178 (illustrated schematically in FIG. 1) by preventing flow of pressurized air from the brake service line 20 towards the spring brake actuation valve portion 120. FIG. 1 illustrates the air spring brake unit 18 and brake unit 178 as separate units, although, it should be appreciated by one skilled in the art that the air spring brake unit 18 and brake unit 178 can be combined as a single unit.

The anti-compounding valve portion 180 includes a second valve member 182 which is spaced from the associated valve seat in a first direction for permitting air flow from the supply passage SP to the first and second chambers 24, 26, respectively, and in a second direction for permitting air flow from the brake service line 20 to the supply passage. The second valve member 182 includes an annular portion 186 having a first surface 190 in selective sealing engagement with a third chamber first valve seat 192. The first valve seat 192 is formed on an inboard end of an adapter member 196. An inner surface of the adapter member defines a passageway 198 in communication with the service passage SRP. A second surface 200 of the annular portion 186 is in selective sealing engagement with a third chamber second valve seat 202 defined by a sleeve 204 formed within the housing 22. The sleeve includes a passageway 206 for fluidly connecting the second and third chambers 26, 28, respectively.

The general operation of the valve 10 will now be described. Air at a first predetermined pressure delivered from the air source 14 is introduced into the valve 10 through the supply passage SP and flows into the third chamber 28, and chamber 26 because valve member 182 is in the raised position. This pressurized air directed towards the anti-compounding valve cluster 180 acts on the second surface 200 of the annular portion 186 of the second valve member 182 which, in turn, further opens and deflects the second valve member away from the second valve seat 202. This causes the second valve member 182 to move into sealing engagement with first valve seat 192 thereby closing the service passage SRP associated with the second valve member 182. The pressurized air, which is prevented from entering the first chamber 24 by the first valve member 62 of the pressure protection valve portion 60, flows into the sleeve passageway 206. As previously mentioned, upon the air reaching a second predetermined pressure, the first valve member 62 will move to its open position thereby allowing air to flow into the first chamber 24 and to the reservoir 16. More particularly, the air will flow through the first groove 80 into the first chamber. The air will then be directed into the second groove 90 towards the reservoir passage RP. However, the first valve member will not allow the air in the reservoir to flow toward the supply passage in case of any reduction of air pressure in this line. Preventing flow towards the 26 decreases the amount of cycles that valve 122 is subject to during anti-compounding applications.

Air under pressure flows into the second chamber 26 and actuates the spring brake actuation valve portion 120. More particularly, and as shown in FIG. 6, the pressurized air engages the annular portion 124 of the quick release diaphragm 122. The diaphragm is deflected in a first direction such that the first surface 132 of the annular portion disengages from the valve seat 130. The pressurized air also causes the central portion 138 to sealingly engage the valve seat 152 of the member 140 thereby closing the exhaust passage EP. The pressurized air is permitted to flow from the supply passage SP to the delivery passage DP to charge the service brake unit 18. This releases the parking brakes of the trailer.

As the air in the delivery passage reaches a third predetermined pressure, and the pressurized air flow from supply port begins to balance. As shown in FIG. 7, in this hold condition, the diaphragm 122 prevents air within the brake 18 from flowing toward passageway 206. The annular portion 124 sealingly engages valve seat 130 and the central portion remains sealingly engaged with valve seat 152. This maintains the pressurized air in the delivery passage DP at the third predetermined pressure.

With reference to FIG. 8, to control a parking application of the spring brake unit 18, pressurized air is delivered from the at least one delivery passage DP to the exhaust passage EP. More particularly, as the pressure from the supply passage decreases to a fourth predetermined pressure, the pressurized air in the at least one delivery passage acts on the second surface 134 of the annular portion 124, which, in turn, causes the diaphragm 122 to deflect in a second direction. This deflection causes the central portion 138 to disengage from valve seat 152 thereby permitting air flow from the delivery passage to the exhaust outlet to exhaust the compressed air to atmosphere after application of the brake unit. If the supply passage pressure continues to decrease slowly and is above a predetermined hold off pressure, the diaphragm 122 will maintain DP pressure at approximately a 2.5 to 1 ratio as the pressure continues to reduce. However, if the air pressure from the supply passage is reduced rapidly, the diaphragm will lift to rapidly exhaust the air in the at least one service brake unit 18 to atmosphere through the exhaust passage EP.

Figure 9:
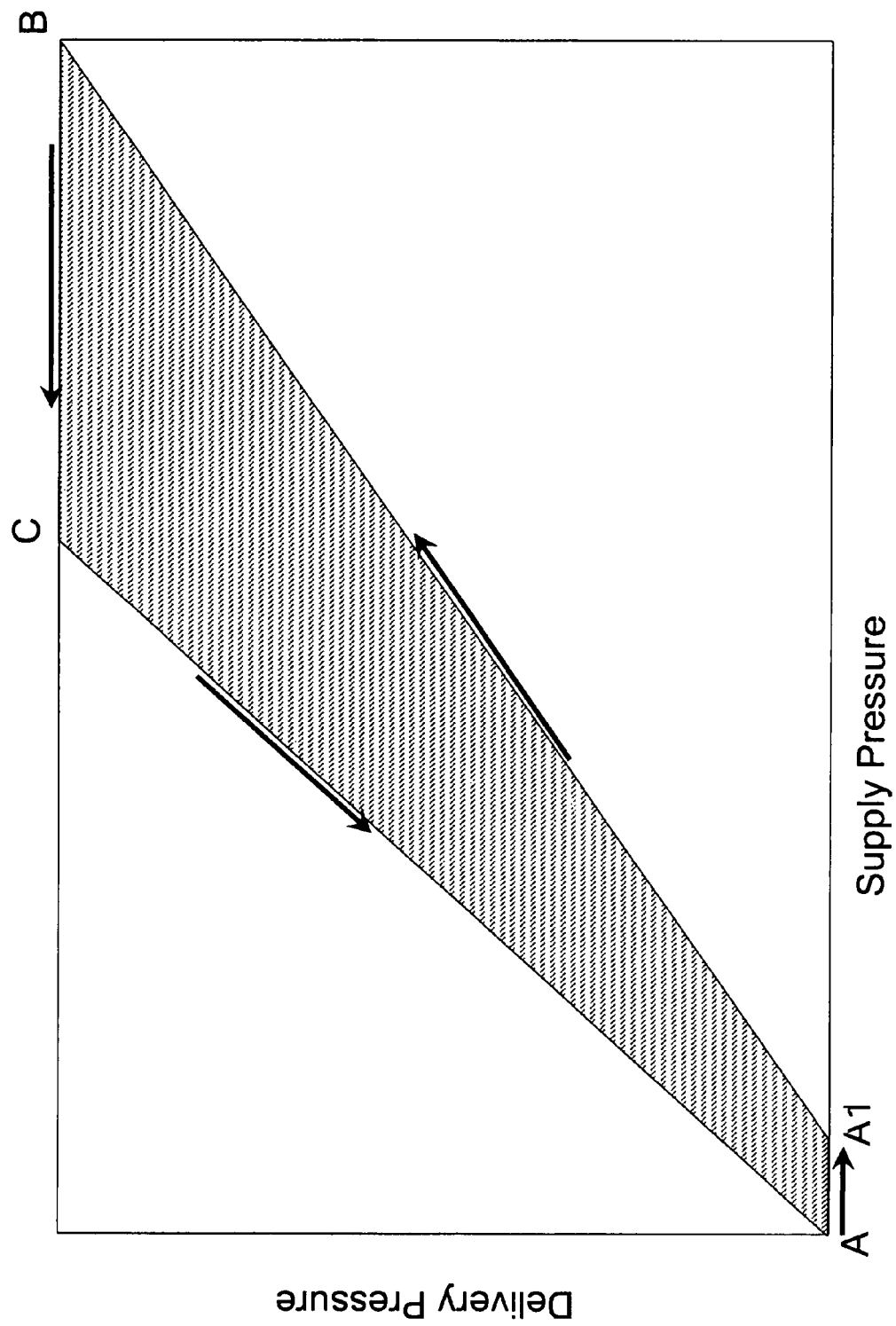
FIG. 9 is a graphical illustration of a characteristic curve of the valve of FIG. 1.

FIG. 9 is a characteristic curve illustrating the relationship between the supply passage pressure and the delivery passage pressure, as previously described with respect to FIGS. 5-8. The diaphragm 122 is initially pre-stressed (A→A1). Pre-stressing in the above application is advantageous is controlling leakage through valve seats. Pre-stressing also promotes actuation of the valve when supply pressure is slowly reduced. Non stressed diaphragms function erratically. As pressure builds in the supply passage SP, the pressure in the delivery passage DP builds from point A1 to B. Thereafter, any reduction in the supply passage pressure will not affect the delivery passage or brake unit pressure unless the supply pressure is reduced below "hold off" pressure (B→C). Further reductions in supply passage SP pressure result in the delivery passage pressure being reduced at approximately twice the rate of the supply passage pressure. This relationship is illustrated by the lines connecting points B, C and A.

As previously mentioned, under certain pressure balance conditions, air under pressure from the brake service line 20 can also enter the valve 10 via the adapter member 196 and reaches the anti-compounding valve portion 180. If the third chamber 28 is already pressurized, the design of the second valve member 182 is such that nothing will happen. However, if the supply port has been evacuated in order to actuate the at least one spring brake unit 18, then brake service line air is free to flow past the second valve member 182 to the evacuated supply passage inlet, reducing the amount of pressure in the brake service line. More particularly, this pressurized air from the brake service line 20 engages the first surface 190 of the annular portion 186 of the second valve member 182 which, in turn, deflects the second valve member away from the first valve seat 192. This deflection causes the second valve member 182 to move into sealing engagement with the second valve seat 202 thereby closing passageway 206. This, in turn, prevents flow of pressurized air from the brake service line towards the spring brake actuation valve portion. This prevents communication to the on/off parking valve portion and vents the air out the evacuated system passage. An audible warning is advantageously provided to the driver/operator so that he knows that the anti-compounding function is working. This arrangement also prevents air from flowing toward the spring brake valve portion.

Figure 10:
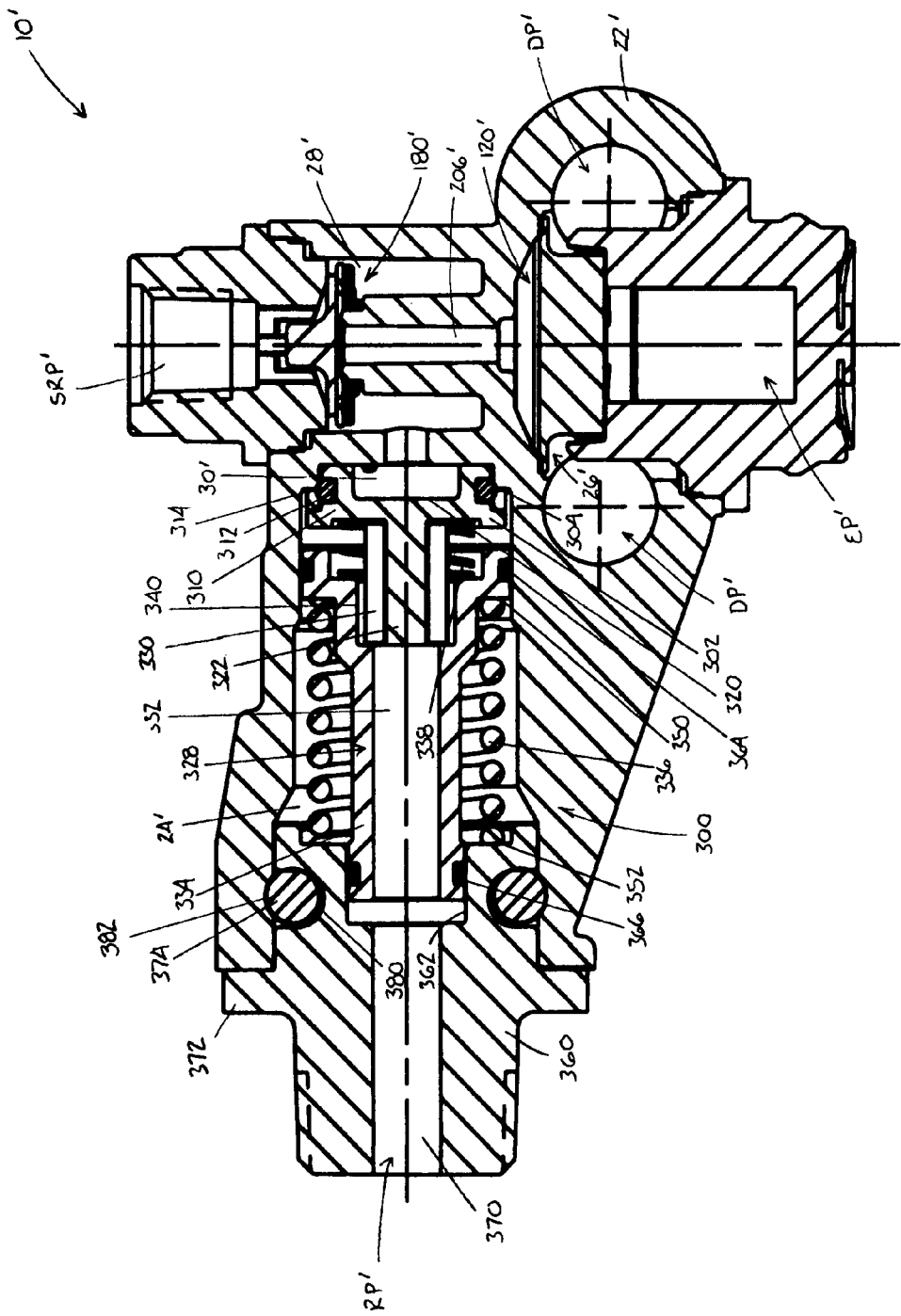
FIG. 10 is a cross-sectional view of a valve for use in a pneumatic system of a truck-trailer in accordance with a second aspect of the present disclosure.

With reference to FIG. 10, an alternative embodiment of a brake valve is illustrated. Since most of the structure and function is quite similar, reference numerals with a single primed suffix (') refer to like components (e.g., valve 10 is referred to by reference numeral 10'), and new numerals identify new components in the additional embodiment.

The valve 10' comprises a valve body 22' that includes a supply passage (not visible), at least one delivery passage DP', an exhaust passage EP', a reservoir passage RP' and a service passage SRP'. The valve body further includes first, second and third chambers 24', 26' and 28', respectively.

A pressure protection valve portion or cluster 300 is operably disposed within the first chamber of the valve body. The pressure protection valve cluster generally includes a first valve member 302 reciprocally movable within the first chamber 24' from a first position in sealing engagement with a first chamber valve seat 304 formed at the inlet 30'. The first valve member 302 includes an extension member 310 at least partially received in the first chamber inlet for selectively closing off the inlet from the flow of pressurized air from the supply port. A groove 312, which circumscribes a section of the extension member, receives a seal member 314. The seal member sealingly engages the valve seat 304 in the first, closed position to prevent communication of air between the first valve member 302 and the first chamber inner wall. The extension member further includes a first cutout or recess 320.

The first valve member further includes an elongated stem 322 extending outwardly from the extension member into the first chamber 24'. The stem projects at least partially through a cap or piston assembly 328 located in the first chamber and includes a longitudinally extending second cutout or groove 330. Similar to the previous embodiment, the first cutout allows pressurized air to flow from the supply port into the first chamber and the second cutout allows pressurized air to flow from the first chamber, through a passage 332 of the piston assembly to the reservoir port RP' when the first valve member 302 is in the second position.

The piston assembly 328 includes a valve body 334, a first biasing member 336 and a second biasing member 338. The valve body includes a counter bore 340 which receives a first end portion of the stem 322. The first biasing member at least partially circumscribes a portion of the valve body. The second biasing member at least partially circumscribes a portion of the stem 322. The first and second biasing members urge the first valve member 302 toward the closed position. The first biasing member is in engagement at a first end with a shoulder 350 formed on the valve body. A second end of first biasing member is in engagement with a shoulder 352 provided on an adapter member 360. The second biasing member is in engagement at a first end with the counter bore 340 and at a second end with the extension member 310.

With continued reference to FIG. 10, a portion of the valve body is at least partially received in a counter bore 362 of the adapter member. The adapter member is provided with a passage 370 in communication with the passage 332 of the piston assembly. A shoulder 372 of the adapter member abuts against the valve body 22' in an installed position. A pin 372 is provided for securing the adapter member to the housing. More particularly, the pin is receiver in corresponding grooves 380, 382 located on the adapter member and valve body, respectively.

Similar to the previous embodiment, a spring brake actuation valve portion or cluster 120' is housed within the second chamber 26' of the valve body 22'. The spring brake actuation valve portion is configured to control pressurized air flow toward the spring brake unit via the delivery passage DP' and the exhaust port EP'. An anti-compounding valve portion or cluster 180' is operably disposed within the third chamber 28' of the valve body. The anti-compounding valve portion is configured to prevent simultaneous application of the air spring brake unit and brake unit by preventing flow of pressurized air from a brake service line towards the spring brake actuation valve portion 120'.

As to a further discussion of the manner of usage and operation of the second embodiment, the same should be apparent from the above description relative to the first embodiment. Accordingly, no further discussion relating to the manner of usage and operation will be provided.

It will be appreciated that variants of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A valve for use in a truck-trailer system having a source of air under pressure, a reservoir, at least one spring brake unit and a brake service line, the valve comprising:
    a body having a supply passage in communication with the associated source of air under pressure;
    a pressure protection valve portion that includes a first valve member and is operably disposed within a first chamber of the body, the first chamber having an inlet for communication with the supply passage and an outlet for communication with the reservoir, the pressure protection valve portion configured to selectively block the flow of pressurized air from the supply passage through the first chamber to the reservoir until a predetermined pressure is reached;
    a spring brake actuation valve portion operably disposed within a second chamber of the body, the second chamber having an inlet for communicating with the supply passage, at least one delivery outlet passage in selective communication with the at least one spring brake unit and an exhaust outlet in selective communication with the at least one spring brake unit, the spring brake actuation valve portion controlling pressurized air flow toward the at least one spring brake unit and the exhaust outlet; and
    an anti-compounding valve portion operably disposed within a third chamber of the body for preventing simultaneous application of the at least one spring brake unit and at least one service brake unit, the third chamber having a first inlet in communication with the supply passage, a second inlet in communication with the brake service line and a first outlet in communication with the first chamber and a second outlet in communication with the second chamber, the anti-compounding valve portion preventing flow of pressurized air from the brake service line towards the spring brake actuation valve portion;
    wherein the anti-compounding valve portion includes a second valve member that includes an annular portion having a first surface in sealing engagement with a third chamber first valve seat and a second surface in sealing engagement with a third chamber second valve seat.

2. The valve of claim 1, wherein the pressure protection valve portion includes:
    the first valve member, which is movable from a first position in sealing engagement with a first chamber valve seat formed at the inlet of the first chamber to a second position spaced from the valve seat, and
    a cap assembly including a biasing member for urging the first valve member toward the closed position.

3. The valve of claim 2, wherein the first valve member includes:
    an extension member at least partially received in the first chamber inlet for selectively sealing off the inlet from the flow of air from the supply passage, and
    a stem extending from the extension member, the stem projecting at least partially through the cap assembly, the biasing member at least partially circumscribing the stem.

4. The valve of claim 1 wherein the spring brake actuation valve portion includes a pre-stressed, quick release diaphragm for selectively isolating the second chamber inlet, the delivery passage and the exhaust outlet from each other, the diaphragm being deflectable in a first direction for permitting air flow from the supply passage to the delivery passage to charge the spring brake unit with compressed air and in a second direction for permitting air flow from the delivery passage to the exhaust outlet to exhaust the air to atmosphere.

5. The valve of claim 4, wherein the pre-stressed, quick release diaphragm includes an annular portion in selective engagement with an annular valve seat defined by a second chamber forming surface of the housing, a first surface of the annular portion being subject to pressure from the supply passage, a second surface of the annular portion being subject to pressure from the delivery passage.

6. The valve of claim 5, wherein the pre-stressed, quick release diaphragm includes a central portion for selectively blocking air from the delivery passage to the exhaust outlet.

7. The valve of claim 6, wherein the spring brake actuation valve portion includes a member at least partially received in the exhaust outlet, the member including a passageway which cooperates with the housing to form an exhaust port, and wherein the member includes a guide for at least partially receiving the central portion of the diaphragm, the guide defining a valve seat, the diaphragm being in selective engagement with the valve seat.

8. The valve of claim 4, wherein the spring brake actuation valve portion includes a member at least partially received in the exhaust outlet, the member including:
    a passageway which cooperates with the housing to form an exhaust passage,
    a counter bore for at least partially receiving the diaphragm, and
    a valve seat in selective engagement with the diaphragm.

9. A method of operating the valve of claim 4 comprising:
applying a pre-stress to the quick release diaphragm;
releasing the spring brake unit by delivering pressurized air from the supply passage to the delivery passage; and
controlling a parking application of the spring brake unit by delivering pressurized air from the spring brake unit to the exhaust passage.

10. The valve of claim 1 wherein the spring brake actuation portion includes:
a resilient diaphragm having a resilient central portion and a resilient annular flange;
an inlet valve seat in communication with the second chamber inlet and configured to selectively seal the resilient member flange;
an exhaust valve seat in communication with the exhaust passage and configured to selectively seal the central portion; and
an element disposed adjacent the exhaust valve seat which engages and compresses the resilient central portion to bias the central portion away from the exhaust valve seat and bias the resilient annular flange against the inlet valve seat with at least 1 psi of force.

11. A valve for use in a truck-trailer system having a source of air under pressure, a reservoir, at least one spring brake unit and a brake service line, the valve comprising:
a body having a supply passage in communication with the associated source of air under pressure;
a pressure protection valve portion operably disposed within a first chamber of the body, the first chamber having an inlet for communication with the supply passage and an outlet for communication with the reservoir, the pressure protection valve portion configured to selectively block the flow of pressurized air from the supply passage through the first chamber to the reservoir until a predetermined pressure is reached;
a spring brake actuation valve portion operably disposed within a second chamber of the body, the second chamber having an inlet for communicating with the supply passage, at least one delivery outlet passage in selective communication with the at least one spring brake unit and an exhaust outlet in selective communication with the at least one spring brake unit, the spring brake actuation valve portion controlling pressurized air flow toward the at least one spring brake unit and the exhaust outlet; and
an anti-compounding valve portion operably disposed within a third chamber of the body for preventing simultaneous application of the at least one spring brake unit and at least one service brake unit, the third chamber having a first inlet in communication with the supply passage, a second inlet in communication with the brake service line and a first outlet in communication with the first chamber and a second outlet in communication with the second chamber, the anti-compounding valve portion preventing flow of pressurized air from the brake service line towards the spring brake actuation valve portion;
wherein the anti-compounding valve portion includes a second valve member deflectable in a first direction for permitting air flow from the supply passage to the first and second chambers and in a second direction for permitting air flow from the brake service line to the supply passage; and
wherein the second valve member includes an annular portion having a first surface in sealing engagement with a third chamber first valve seat and a second surface in sealing engagement with a third chamber second valve seat, the first surface being subject to pressure from the supply passage, the second surface being subject to pressure from the service brake line, wherein upon pressure from the brake service line, the second valve member moves away from the second valve seat, the air from the service brake line venting out of the supply passage.

12. A valve for use in a pneumatic system of a truck-trailer having a source of air under pressure, a reservoir, at least one spring brake unit and a brake service line, the valve comprising:
a housing including:
a supply passage in communication with the source of air under pressure,
at least one delivery passage in communication with the supply passage and the spring brake unit,
an exhaust passage in communication with the spring brake unit,
a reservoir passage in communication with the supply passage and the reservoir, and
a service passage in communication with the brake service line and the supply passage;
a pressure protection valve means disposed within a first chamber of the housing for selectively blocking the flow of pressurized air from the supply passage to the reservoir through the reservoir passage until a predetermined pressure is reached;
a spring brake actuation valve means disposed within a second chamber of the housing for controllably allowing pressurized air flow toward one of the delivery passage and the exhaust passage, the spring brake actuation valve means including a pre-stressed quick release diaphragm; and
an anti-compounding valve means disposed within a third chamber defined by the housing for preventing simultaneous application of the air spring brake unit and service brake unit, the anti-compounding valve means preventing flow of pressurized air from the brake service line towards the pre-stressed quick release diaphragm;
wherein the anti-compounding valve means includes a valve member that includes an annular portion having a first surface in sealing engagement with a third chamber first valve seat and a second surface in sealing engagement with a third chamber second valve seat, the first surface being subject to pressure from the supply passage, the second surface being subject to pressure from the service brake line.

13. The valve of claim 12, wherein the quick release diaphragm is pre-stressed between approximately 1 psi and approximately 5 psi.

14. The valve of claim 12, wherein the spring brake actuation valve means includes means for at least partially receiving the diaphragm and a valve seat in selective engagement with the diaphragm and in communication with the exhaust passage.

15. A diaphragm for use in the valve of claim 12.

* * * * *